United States Patent [19]

Scaduto

[11] Patent Number: 4,832,397
[45] Date of Patent: May 23, 1989

[54] CONVERTIBLE TOP FOR AUTOMOBILES

[76] Inventor: Onofrio Scaduto, 1623 South 56th Court, Cicero, Ill. 60650

[21] Appl. No.: 116,057

[22] Filed: Nov. 2, 1987

[51] Int. Cl.$^4$ .............................................. B60J 7/12
[52] U.S. Cl. .................................... 296/107; 296/122
[58] Field of Search ............... 296/105, 107, 109, 111, 296/112, 116–118, 121, 122, 123

[56] References Cited

U.S. PATENT DOCUMENTS

| 1,426,129 | 8/1922 | Velo | 296/107 |
|---|---|---|---|
| 1,981,060 | 11/1934 | Miller | 296/116 |
| 2,040,680 | 5/1936 | Westrope | 296/107 |
| 2,079,232 | 5/1937 | Smith | 296/116 |
| 2,785,922 | 4/1953 | Chika | 296/107 |
| 4,621,861 | 11/1986 | Scaduto . | |

FOREIGN PATENT DOCUMENTS

| 175478 | 12/1952 | Fed. Rep. of Germany | 296/107 |
|---|---|---|---|
| 1505474 | 7/1969 | Fed. Rep. of Germany | 296/107 |
| 598400 | 12/1925 | France | 296/116 |
| 527071 | 5/1955 | Italy | 296/107 |
| 159755 | 3/1921 | United Kingdom | 296/108 |
| 2086316 | 5/1982 | United Kingdom | 296/107 |

Primary Examiner—Dennis H. Pedder
Attorney, Agent, or Firm—Baker, Maxham, Jester & Meador

[57] ABSTRACT

A convertible top structure for an automobile includes a support bow having foldable legs rotatably geared together on a stabilizing link for positive rotation together to a collapsible position.

20 Claims, 2 Drawing Sheets

CONVERTIBLE TOP FOR AUTOMOBILES

BACKGROUND OF THE INVENTION

The present invention relates to automobile tops and pertains particularly to a compact collapsible convertible top structure.

In my U.S. Pat. No. 4,621,861 granted Nov. 11, 1986, entitled "CONVERTIBLE TOP FOR AUTOMOBILES", I disclose a compact collapsible convertible top. The present invention is an improvement in compact tops of that character.

In my aforementioned prior U.S. patent, I disclose a compact linkage arrangement for adapting to certain small mid engine automobiles to provide a concealable foldable top. The present invention is an improvement over the linkage of that system and provides a simple stable linkage that also enables the simple application of a power actuator for raising and lowering the convertible top.

SUMMARY AND OBJECTS OF THE INVENTION

It is the primary object of the present invention to provide an improved convertible linkage system.

In accordance with the primary aspect the present invention, a linkage system for a convertible top comprises a bow having upper and lower legs pivotally mounted to a support link and drivingly connected, such that rotation of one of the upper and lower legs simultaneously rotates the other linkage in an opposite direction between an extended support position and a retracted position.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
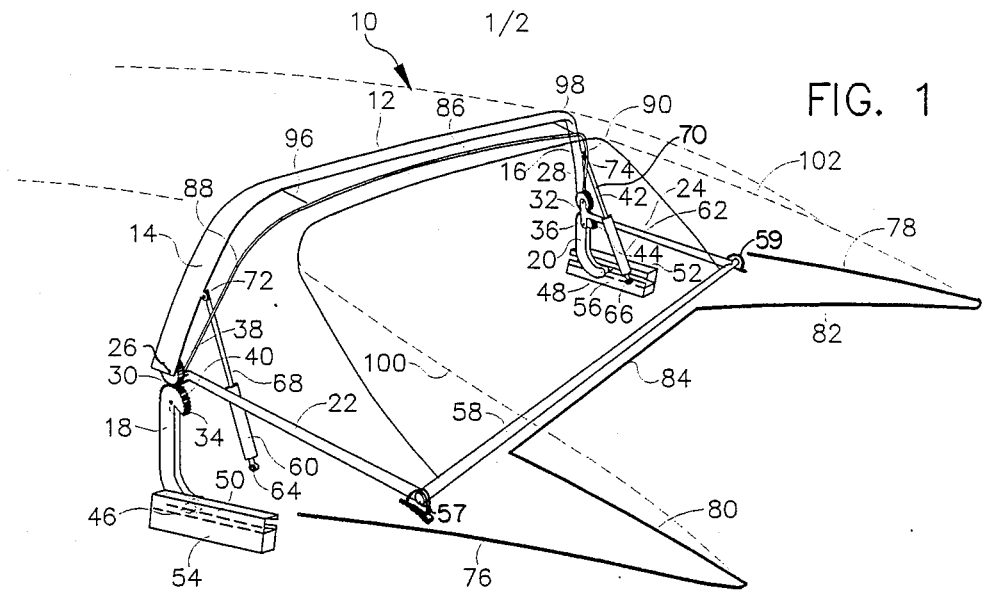
FIG. 1 is a perspective view of a convertible top embodying linkage system in accordance with a preferred embodiment of the invention.
Figure 2:
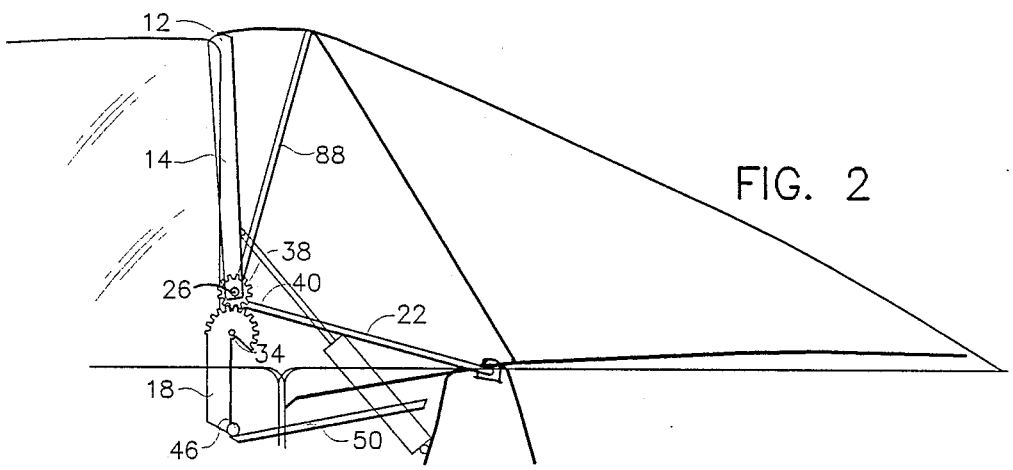
FIG. 2 is a side elevation view showing the linkage of FIG. 1 in the extended support position.

Referring to FIGS. 1 and 2 of the drawings, there is illustrated a convertible top and linkage system in accordance with the invention, designated generally by the numeral 10. The linkage system comprises a foldable or main bow comprising a central cross member 12 for spanning the width of the vehicle passenger compartment and having a pair of downwardly depending upper legs 14 add 16 at the opposite ends thereof. Lower leg or link members 18 and 20 are each pivotally connected at the upper end to a support link 22 and 24, respectively. The upper legs 14 and 16 of the bow are each connected respectively at pivot or pins 26 and 28 to an outer end 30 and 32 of the support links 22 and 24.

The upper ends of the lower legs or links 18 and 20 are each connected at pivot pins 34 and 36 to the outer ends 30 and 32 of the links 22 and 24. The outer ends 30 and 32 preferably have a T or Y configuration to accommodate the vertically spaced pivot pins. The pivot pins for the upper legs and lower legs are spaced apart slightly, and the upper and lower leg members are each connected together by means of upper and lower pairs of sector gears 38, 40 and 42, 44 on the inside of the ends thereof. These sector gears are either integral with or fixed to and drivingly connect the upper and lower leg members 14 and 18 together such that rotation of one about its axis rotates the other one in a similar manner, but in an opposite direction about its axis, such that they fold toward one another to the collapsed position.

The lower ends of the lower legs or links 18 and 20 each are provided with an offset roller or follower 46 and 48, each of which are mounted within a respective track 50 and 52 in a bracket attachably mounted to the side panel of the automobile body or chassis.

The link members 22 and 24 are each pivotally connected at the back end to the auto chassis by suitable pins or the like that are positioned in a fixed position, such that the links swing in an arc about this point. In a preferred embodiment, the trailing or back ends of each link are preferably rigidly connected to a transverse shaft 58, which is journaled at each end in suitable bearings or the like in a bracket 57 and 59 to the chassis of the vehicle. The rigid connection of the links to the shaft 58 provides high stability, both laterally and vertically to the linkage system. The cross connection insures that both links will rise and fall together and strengthens them laterally to add stability in the lateral dimension to the assembly.

Figure 3:
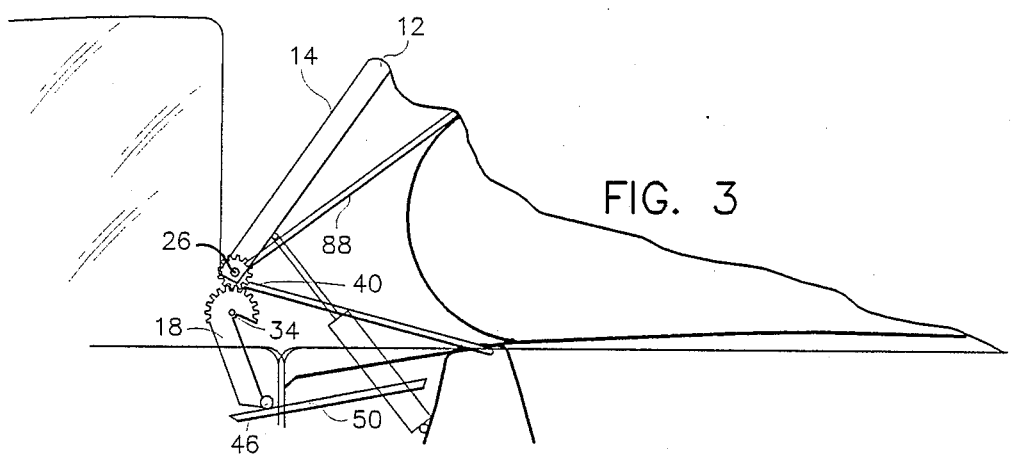
FIG. 3 is a side elevation view like FIG. 2 showing the linkage in an intermediate position between the extended support position and the retracted position.
Figure 4:
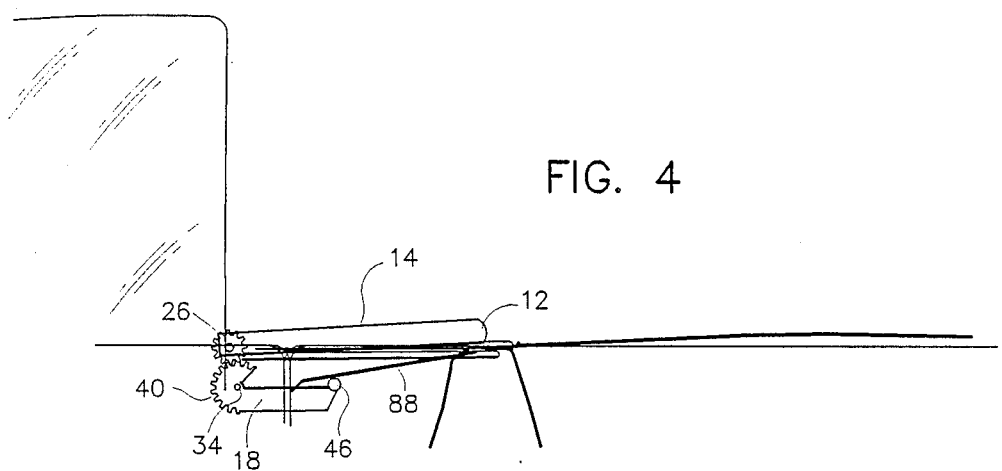
FIG. 4 is a side elevation view like FIG. 3 showing the linkage in the retracted position.

Referring to FIGS. 2-4, it is seen that the support links 22 and 24 are about equal in length to the upper legs of the bow, and the lower legs or links 18 and 20 are about half the length of the upper legs of the bow and of the support or stabilizing links 22 and 24. The lower legs 18 and 20 are each about one-half the length of the upper leg.

A pair of actuating cylinders 60 and 62 are each pivotally connected at one end 64 and 66 to a bracket or bearing within the vehicle chassis and include an actuating rod 68 and 70, which are pivotally connected at 72 and 74 to the linkage system for retracting and extending the linkage. The pivotal connections 72 and 74 are preferably at a point toward the lower end of the upper legs 14 and 16 of the bow. However, these connections can be at substantially any position along the leg, either the legs of the bow or the lower links 18 and 20, such that sufficient leverage is applied to pivot the link about its pivot point. The pivoting of the link member will pivot the other member due to the driving connection therebetween. The sector gears drivingly connect the upper and lower leg members, such that they rotate together in opposite directions toward one another for folding down, as can be seen in progressive illustrations of FIGS. 3 and 4.

As will be appreciated in viewing FIG. 2, the bracket 54 and track 50, and the corresponding track and bracket 52, 56 on the opposite side of the vehicle are below the upper edge of the car body, such that when the top and its linkage are stowed or folded in stowed position, they are retracted below the level of the deck of the vehicle.

The present linkage system is specifically designed to convert certain automobile chassis, particularly the Pontiac Fiero to a convertible vehicle. To this end, the hard top of the vehicle and its trailing wings have been removed by cutting the chassis along the sides of the vehicle, as shown in FIG. 1, along lines 76 and 78 to a rearmost position forming a V with inner line 80 and 82 and across the back of the vehicle chassis at 84. This removes the hard top and provides an edge around which the bottom edge of a soft or canvas top is connected. The canvas top is shaped to provide the wings of the hard top configuration and is supported by means as shown in FIGS. 1-4 of a secondary bow 86 having legs 88 and 90 pivotally connected at the common pivot points 26 and 28 of the main bow.

The upper edges of the top are supported by steel wire or cables 96 and 98, extending between the main or primary bow 12 and a secondary bow 86, and cables 100 and 102 extending from the secondary or auxiliary bow 86 back to convergence of the V sections formed by the body edges 76, 80 and 78, 82. The canvas or fabric material top for the convertible is cut and formed to conform to the configuration of the initial top, and thus has what is typically termed wings that extend backward as illustrated. The forward portion of the top extending over the passenger compartment is supported by linkage substantially as illustrated in my prior patent, which is incorporated herein by reference as though fully set forth.

As will be appreciated when viewing the linkage in FIG. 2 for example, the bow 12 with its leg assemblies 14, 16, 18 and 20 extends in a substantially vertical position substantially ninety degrees to the horizontal when in the fully extended top support position. At this position, the angle between the support link 22 and the horizon is at an angle that is for example on the order of perhaps up to thirty degrees. The angle from this link to the upper legs of the bow is then approximately ninety degrees plus this angle.

Referring then to FIG. 4, it is seen that in the fully collapsed position the bow and the lower leg assembly a well as the link all extend substantially in a horizontal direction. Accordingly, it is seen that the bow must rotate an amount equal to the ninety degrees, plus the angle of the link 22 relative to its pivot pin on link 22 in arriving at this position. Similarly, the lower link or leg 18 pivots an amount of ninety degrees less the angle of link 22 to arrive at this position. For this reason, it is seen that the gear sectors for the upper and lower legs of the bow are at a different gear ratio to arrive at this horizontal position during rotation. In the illustrated arrangement, a gear sector having a three-quarter inch diameter is provided on the upper link 14, with a gear sector of about one inch in diameter for the lower sector gear. Thus, the gear ratio is approximately four to three between the linkages.

Figure 5:
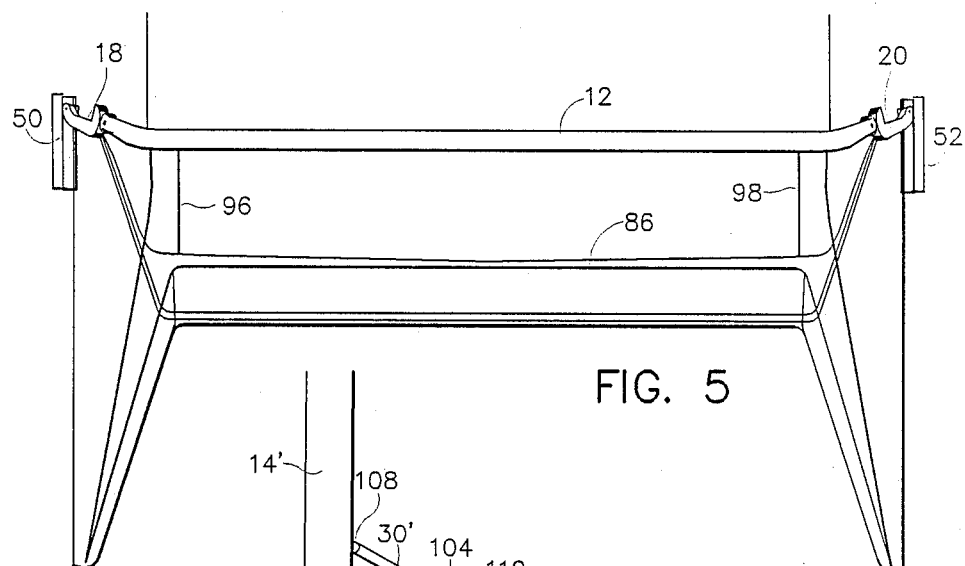
FIG. 5 is a top view of the linkage of FIG. 1.
Figure 6:
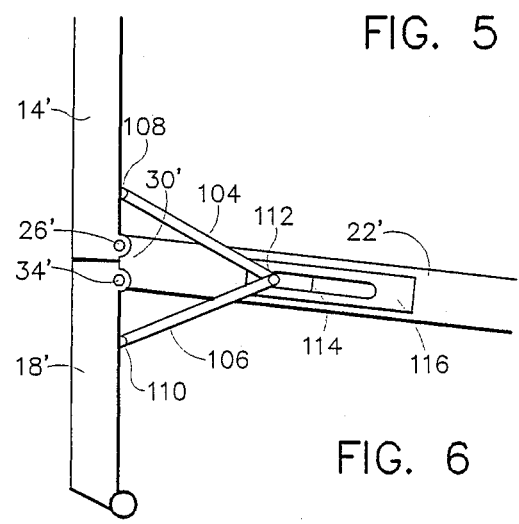
FIG. 6 is a partial side view illustrating an alternate linkage connection.

Referring to FIG. 5 wherein identical members are identified by the same reference numeral primed, an alternate driving connection between the upper leg 14' and the lower leg 18' is illustrated. The upper and lower legs 14' and 18' are pivotally connected at 26' and 34' in the usual manner. A pair of connecting or driving links 104 and 106 are connected at 108 and 110 to the respective legs and to a common pivot pin 112 on a slide or rod 114 of suitable motor, such as an air or hydraulic motor 116. The lever arm of each of the legs must be in the proper portion so that the respective leg will move the proper amount about its pivot upon actuation of the motor 116. Thus, the arm between 26' and 108 must be shorter than the arm 34' to 110 so that they reach the aligned position with link 22' simultaneously.

It is also apparent that the pin 112 may be connected to a slide rather than a motor. This construction would require a manual raising and lowering of the top.

In operation, with the top in the fully up position, as illustrated in FIG. 1, in preparation for retracting and stowing the top, the front of the top is released in a conventional manner from its attachment to the windshield frame and other appropriate fastening means are released in preparation for the retraction. Once the top is in preparation, the cylinders 60 and 62 are actuated and begin to retract, pulling the bow about its pivot axis. This pivoting of the bow about its axis rotates the lower link 18 about its axis, which forces the lower end thereof to slide along the track 52.

As the linkage progressively retracts, as shown in FIG. 3, the top begins to move down with the lower link 18 beginning to move back in the guide track 50. The top and its linkage continues to retract until it reaches the position fully retracted as shown in FIG. 4.

The arrangement may be such that the entire top and its linkage assembly will retract to a position below the deck of the automobile. Alternatively, it may project slightly above the automobile deck. Suitable covers may be provided for covering the top, such as a soft cover or a hard cover as desired. If the top retracts to a position below the deck, then a hard top can be fitted to the deck to cover the opening through which the top and its linkage has been retracted.

While I have illustrated and described my invention by means of specific embodiments, it is to be understood that numerous changes and modifications may be made therein within departing from the spirit and scope of the invention as defined in the appended claims.

I claim:

1. A convertible top linkage assembly comprising:
    a collapsible bow defined by a cross member with first and second legs at opposite ends thereof for mounting on a vehicle body for movement between an extended support position and a retracted stowed position;
    said legs each comprising an upper leg and a lower leg pivotally connected to a common support link; and
    means for drivingly connecting each upper leg to the respective lower leg for rotation together in opposite directions between said extended position and said retracted position.

2. A convertible top linkage assembly according to claim 1 wherein:
    each said lower leg having a lower end mounted in a generally horizontal track.

3. A convertible top linkage assembly according to claim 1 wherein:
    said means for drivingly connecting said upper and lower legs together comprises gear means.

4. A convertible top linkage assembly according to claim 1 wherein:
    said means for drivingly connecting said upper and lower legs together comprises link means.

5. A convertible top linkage assembly according to claim 1 wherein:
    said support link comprises a first end pivotally connected to an auto body; and
    a second end having spaced apart pins for pivotal connection of said upper leg and said lower leg.

6. A convertible top linkage assembly according to claim 5 wherein:
said means for drivingly connecting said upper and lower legs together comprises gear means.

7. A convertible top linkage assembly according to claim 6 wherein:
each said lower leg having a lower end mounted in a generally horizontal track.

8. A collapsible top linkage assembly for an automobile comprising:
a collapsible bow comprising a cross member having first and second foldable legs at opposite ends thereof for mounting on a vehicle body for movement between an extended support position and a retracted stowed position;
an elongated support link having means for pivotal attachment at one end to a vehicle chassis and means for pivotal support of said foldable legs at the other end;
said foldable legs each comprising an upper leg and a lower leg pivotally connected to said other end of said support link; and
means for drivingly connecting each upper leg to the respective lower leg for rotation together in opposite directions between said extended position and said retracted position.

9. A convertible top linkage assembly according to claim 8 wherein:
each said lower leg having a lower end mounted in a generally horizontal track.

10. A convertible top linkage assembly according to claim 9 wherein:
said means for drivingly connecting said upper and lower legs together comprises gear means.

11. A convertible top linkage assembly according to claim 8 wherein:
said means for drivingly connecting said upper and lower legs together comprises link means.

12. A convertible top linkage assembly according to claim 11 wherein:
said support link is about equal in length to said upper leg; and
said lower leg is about one-half the length of said upper leg.

13. A convertible top linkage assembly according to claim 12 wherein:
said support link comprises a pair of links spaced apart and rigidly connected to opposite ends of an elongated shaft.

14. A convertible top linkage assembly according to claim 13 wherein:
said linkage further comprises a linear motor operatively connected to one of said legs for moving said linkage between said collapsed and said extended positions.

15. A collapsible top linkage assembly for an automobile comprising:
an elongated support link having means for pivotal attachment at one end to a vehicle chassis and means for pivotal support of linkage means at the other end;
a collapsible bow comprising a cross member having a foldable leg on each end thereof for mounting on a vehicle body for movement between an extended support position and a retracted stowed position;
said foldable leg comprising an upper leg and a lower leg pivotally connected to said other end of said support link; and
means for drivingly connecting each upper leg to the respective lower leg for rotation together in opposite directions between said extended position and said retracted position.

16. A convertible top linkage assembly according to claim 15 wherein:
a generally horizontal track for attachment to a vehicle body; and
said lower leg having a lower end mounted in said generally horizontal track.

17. A convertible top linkage assembly according to claim 16 wherein:
said means for drivingly connecting said upper and lower legs together comprises gear means.

18. A convertible top linkage assembly according to claim 17 wherein:
said support link is about equal in length to said upper leg; and
said lower leg is about one-half the length of said upper leg.

19. A convertible top linkage assembly according to claim 18 wherein:
said support link comprises a pair of links spaced apart and rigidly connected to opposite ends of an elongated shaft.

20. A convertible top linkage assembly according to claim 19 wherein:
said linkage further comprises a linear motor operatively connected to one of said legs for moving said linkage between said collapsed and said extended positions.

* * * * *